US012693823B2

(12) United States Patent
    Welgemoed

(10) Patent No.:     US 12,693,823 B2
(45) Date of Patent:          Jul. 28, 2026

(54) MANAGING DISPLAY DATA

(71) Applicant: SYNAPTICS INCORPORATED, San
              Jose, CA (US)

(72) Inventor: Christo Welgemoed, Cambridge (GB)

(73) Assignee: Synaptics Incorporated, San Jose, CA
              (US)

( * ) Notice:   Subject to any disclaimer, the term of this
              patent is extended or adjusted under 35
              U.S.C. 154(b) by 384 days.

(21) Appl. No.: 17/193,952

(22) Filed:     Mar. 5, 2021

(65)              Prior Publication Data
        US 2022/0283767 A1     Sep. 8, 2022

(51) Int. Cl.
      *G06F 3/14*          (2006.01)
      *H04L 12/18*         (2006.01)
(52) U.S. Cl.
      CPC ........ *G06F 3/1423* (2013.01); *H04L 12/1827*
                                              (2013.01)
(58) Field of Classification Search
      CPC ........................... G06F 3/1423; H04L 12/1827
      USPC ........................................................ 709/223
      See application file for complete search history.

(56)              References Cited

U.S. PATENT DOCUMENTS

2013/0297819 A1*  11/2013  Mittal ................... H04L 47/781
                                                          709/232
2015/0049249 A1*   2/2015  Shao ...................... H04N 21/47
                                                          348/564
2016/0189688 A1*   6/2016  Morein .................... G09G 5/39
                                                          345/545
2019/0371253 A1*  12/2019  Morein ................ G09G 3/3406

OTHER PUBLICATIONS

UKIPO Combined Search and Examination Report, dated Oct. 28,
2022, Application No. GB2203062.1, pp. 1-13.

* cited by examiner

*Primary Examiner* — Vivek Srivastava
*Assistant Examiner* — Hien V Doan
(74) *Attorney, Agent, or Firm* — Paradice & Li LLP

(57)              ABSTRACT
The present disclosure relates to a method of managing
display data in a system comprising a host device and a
plurality of client devices connected to the host device. The
method comprises receiving display data from at least one
client device of the plurality of client devices at the host
device via a shared connection between the plurality of
client devices and the host device; generating, at the host
device, control information for controlling generation,
encoding and/or transmission of the display data by the at
least one client device of the plurality of client devices; and
transmitting the control information from the host device to
the at least one client device of the plurality of client devices.

15 Claims, 8 Drawing Sheets

Figure 5

S601: Transmit generated display data

S602: Receive control information

S603: Adjust resource usage

S604: Transmit generated display data

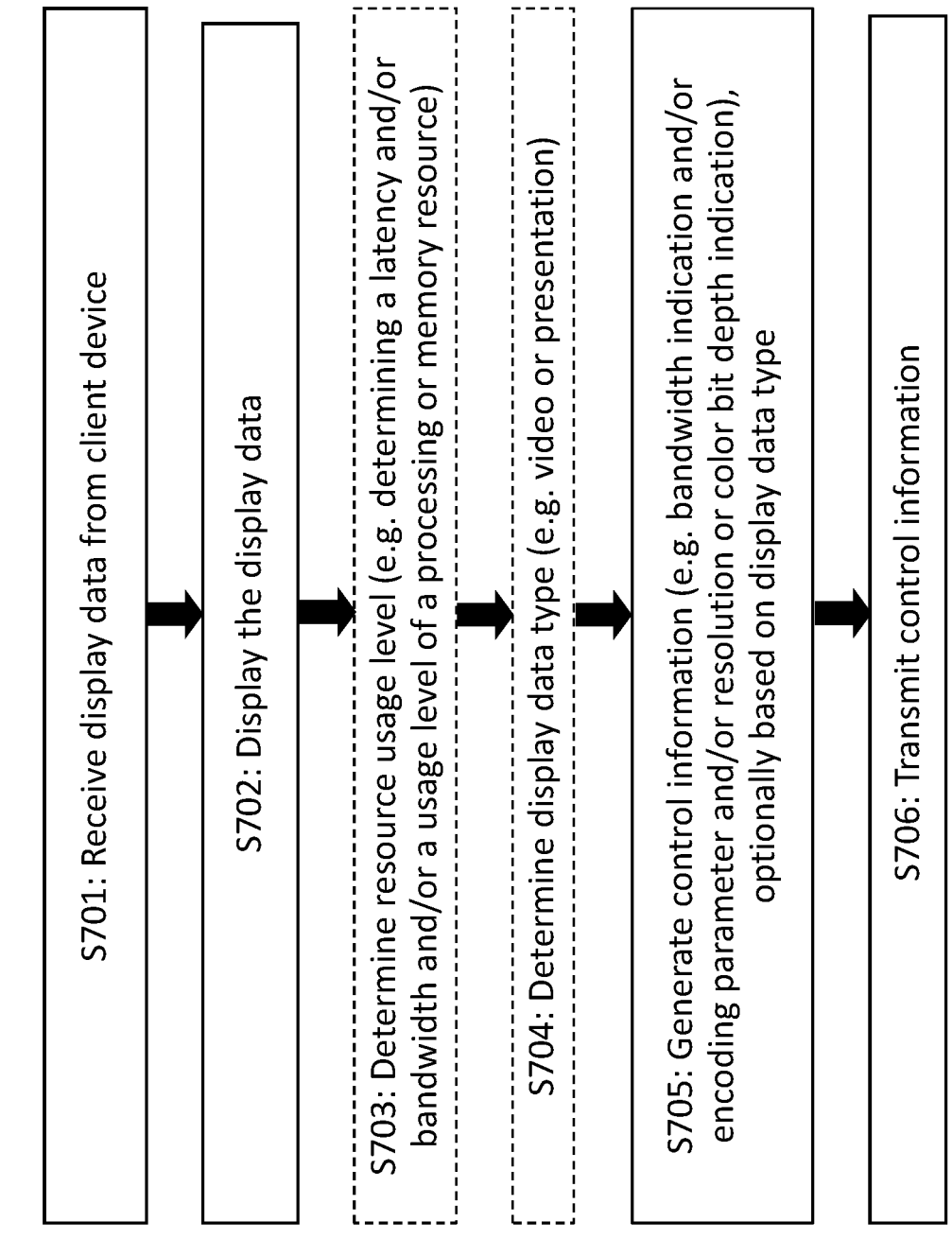

Figure 7

S701: Receive display data from client device

S702: Display the display data

S703: Determine resource usage level (e.g. determining a latency and/or bandwidth and/or a usage level of a processing or memory resource)

S704: Determine display data type (e.g. video or presentation)

S705: Generate control information (e.g. bandwidth indication and/or encoding parameter and/or resolution or color bit depth indication), optionally based on display data type S706: Transmit control information

Figure 8:
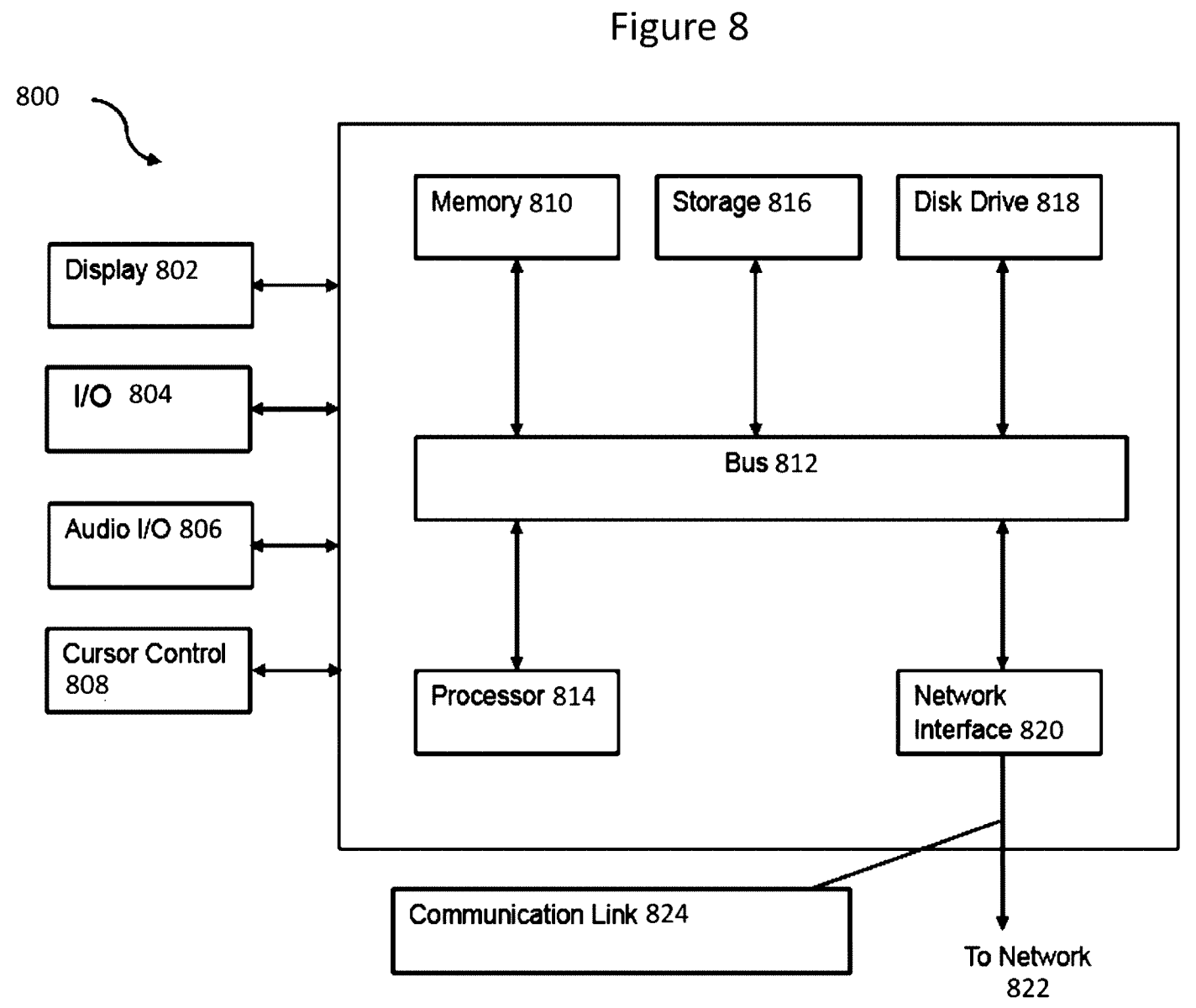

Display 802

I/O   804

Audio I/O 806

Cursor Control 808

Memory 810

Storage 816

Disk Drive 818

Bus 812

Processor 814

Network Interface 820

To Network 822

Communication Link 824

MANAGING DISPLAY DATA

BACKGROUND

In a meeting room environment, it is common for multiple client devices to be connected to a presentation system, enabling each client device to send display data to a host device of the presentation system over a wired or wireless connection. For example, a first client device may send frames of display data corresponding to slides of a presentation, and the presentation system may display the received display data on a connected display. A second client device may simultaneously transmit frames of a video for display alongside the presentation slides.

It will be appreciated that different types of display data have different quality requirements for transmission and presentation of the images. For example, display data corresponding to a video may require a relatively low level of compression or a relatively high resolution. In contrast, for display data corresponding to presentation slides, low latency between user input at the client device (for example, a command to transition to the next presentation slide) and a subsequent update on the display may be prioritized.

In order to manage the use of the available transmission resources, each client device may attempt to determine the status of the connection between the client device and the presentation system. For example, a client device may monitor the round-trip time taken between transmitting display data to the presentation system and receiving an acknowledgment that the data has been received at the presentation system. A client device may attempt to transmit a larger amount of display data if the client device determines, based on the measurement, that there are sufficient communication resources available between the client device and the presentation system. However, when multiple client devices are connected to the presentation system and each device attempts to perform independent control, the total bandwidth usage by the devices may become chaotic and unpredictable as each device attempts to maximize its own usage of the available bandwidth, without any consideration for the requirements of the other client devices. This may result in high latency and may result in display data being lost entirely. These issues are undesirable in meeting room systems, especially as latency in display updates and low-quality display data becomes more noticeable to users as display technology improves.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

The present disclosure relates to a method of managing display data in a system comprising a host device and a plurality of client devices connected to the host device. The method comprises receiving display data from at least one client device of the plurality of client devices at the host device via a shared connection between the plurality of client devices and the host device. The host device may generate control information for controlling generation, encoding and/or transmission of the display data by the at least one client device of the plurality of client devices. The host device may transmit the control information from the host device to the at least one client device of the plurality of client devices.

Beneficially, centralized control of the resources allocated to each client device for the generation and transmission of display data to the host device enables more detailed and responsive control. Centralized control allows the requirements of each device in the system to be taken into account when allocating the resources of the system and avoids the unpredictable and chaotic behavior that may occur when control is performed individually by each connected client device.

In one example, control may be performed based on the type of display data generated by each client device. For example, a quality policy may be issued to ensure that low latency is achieved when a device is transmitting display data relating to slides of a presentation. In another example, the host device may allocate sufficient resources to a client device that is transmitting video data to ensure that the video data can be encoded, transmitted and presented at an acceptable quality level.

Moreover, the host device may be configured to control the quality level of the display data generated at the connected client devices, rather than merely managing the transmission of the generated display data over the network. Beneficially, this prevents the client devices from generating large amounts of display data for which there is insufficient bandwidth to transmit to the host device.

Additionally, significantly faster quality control may be performed since a suitable quality policy (or control message) can be determined as display data is received at the host device. In contrast, when control is distributed amongst the client devices, each client device must wait for an acknowledgement to be received from the host device before the latency can be calculated and an appropriate parameter (e.g. level of compression) can be determined.

In one example, control may be performed within a single image frame. In other words, the host device may receive display data corresponding to a portion of the image frame and issue a quality policy (or control message) to at least one connected client device before display data corresponding to a subsequent portion of the image frame has been generated and/or transmitted to the host device.

BRIEF DESCRIPTION OF THE DRAWINGS

The present embodiments are illustrated by way of example and are not intended to be limited by the figures of the accompanying drawings.

FIG. 5 shows an example of a centralized control method, in accordance with one or more embodiments of the present disclosure;

FIG. 7 shows an example of a method performed at a host device, in accordance with one or more embodiments of the present disclosure; and FIG. 8 shows an example computer system, in accordance with one or more embodiments of the present disclosure.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure.

However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

Resource Management at Client Devices

Figure 1:
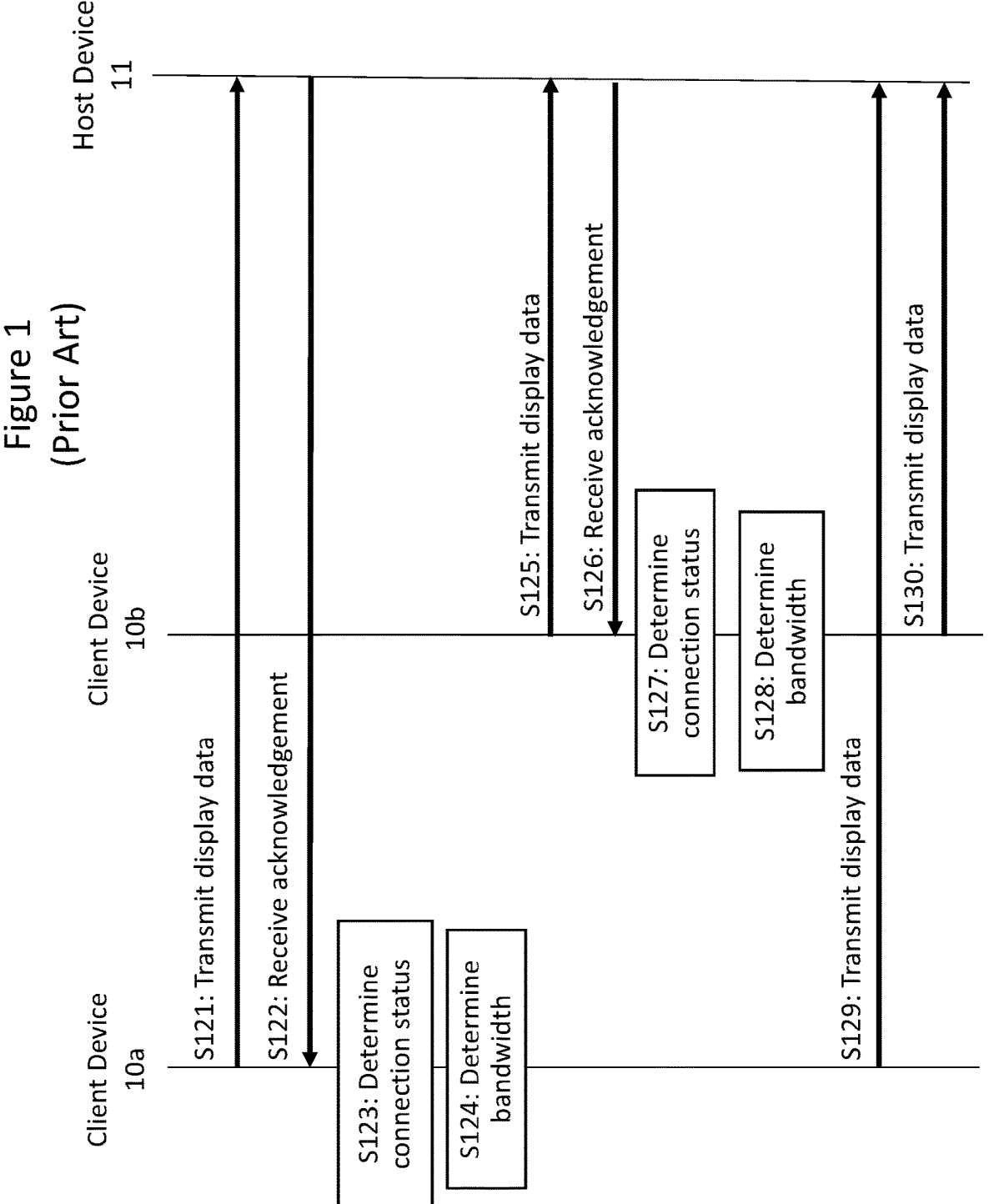
FIG. 1 shows an example of a conventional control method performed at client devices.

A problem that occurs when conventional resource management is performed by client devices in a presentation system will first be described with reference to FIG. 1. FIG. 1 shows an example in which multiple client devices [10a, 10b] are connected to a host device [11] via a shared transmission resource.

In a presentation system, a plurality of client devices [10a, 10b] may be connected to a host device [11] for transmission of display data to the host device [11]. The host device [11] processes and forwards the received display data for display on a connected display. A shared connection between the client devices [10a, 10b] and the host device [11] for transmission of the display data may have a limited bandwidth, and therefore control of the amount of display data transmitted by each of the client devices [10a, 10b] may be desirable to ensure that all devices are able to transmit a sufficient amount of display data to the host device [11].

In Step S121, the first client device [10a] transmits display data to the host device [11] via the shared transmission resource. The host device [11] receives the display data and transmits a corresponding acknowledgement to the client device [10a]. In step S122, the first client device [10a] receives the acknowledgement from the host device [11].

In step S123, the first client device [10a] determines a time between transmitting the display data in step S121 and receiving the acknowledgement in step S122, to estimate a connection status between the first client device [10a] and the host device [11]. For example, the first client device [10a] may estimate a usage of a resource of the connection.

In step S124, the first client device [10a] determines a bandwidth of the connection to the host device [11] to use for display data transmitted by the first client device [10a] to the host device [11].

In step S125, the second client device [10b] transmits display data to the host device [11]. The host device [11] receives the display data and transmits a corresponding acknowledgement to the second client device [10b]. In step S126, the second client device [10b] receives the acknowledgement from the host device [11].

In step S127, the second client device [10b] determines a time between transmitting the display data in step S125 and receiving the acknowledgement in step S126, to estimate a connection status between the second client device [10b] and the host device [11]. For example, the second client device [10b] may estimate a usage of a resource of the connection.

In step S128, the second client device [10b] determines a bandwidth of the connection to use for display data transmitted by the second client device [10b] to the host device [11].

In steps S129 and S130, the first and second client devices [10a, 10b] transmit display data to the host device [11] over the shared connection using the bandwidths determined in steps S124 and S128. However, since the first and second client devices [10a, 10b] were not aware of the amount, type, or quality requirements of the display data to be generated and transmitted by the other client device [10a, 10b] in steps S129 and S130, each client device [10a, 10b] performed resource control in steps S124 and S128 without any consideration for the resources expected to be used by the other client device [10a, 10b]. Therefore, in steps S129 and S130, each client device [10a, 10b] simply attempts to transmit display data at the highest possible quality level to maximize its own use of the available communication resources, based on the determinations in steps S124 and S128. Therefore, when data from both of the client devices [10a, 10b] is transmitted in steps S129 and S130, the available bandwidth of the connection to the host device [11] may be exceeded, resulting in increased latency and/or frames of display data being lost.

Since each client device [10a, 10b] is not aware of the control being performed by other client devices [10a, 10b], the amount of data that will be transmitted by the other client devices [10a, 10b] and the available bandwidth of the connection is difficult or impossible to predict. The client devices [10a, 10b] compete for the communication resources of the shared connection in a chaotic manner and the utilization of the bandwidth of the connection may become unstable. For example, referring back to the example shown in FIG. 1, after the data transmission in steps S129 and S130, each client device [10a, 10b] may detect the over-utilization of the connection (e.g. by measuring a particularly long time between transmitting display data to the host device [11] and receiving a corresponding acknowledgment). Both devices [10a, 10b] may then perform individual control to reduce the amount of transmitted display data, without any consideration for the control being performed by the other client device [10a, 10b], resulting in under-utilization of the connection until further control is performed.

Example Display System

A system for managing display data in a presentation system according to the present disclosure will now be described.

Figure 2:
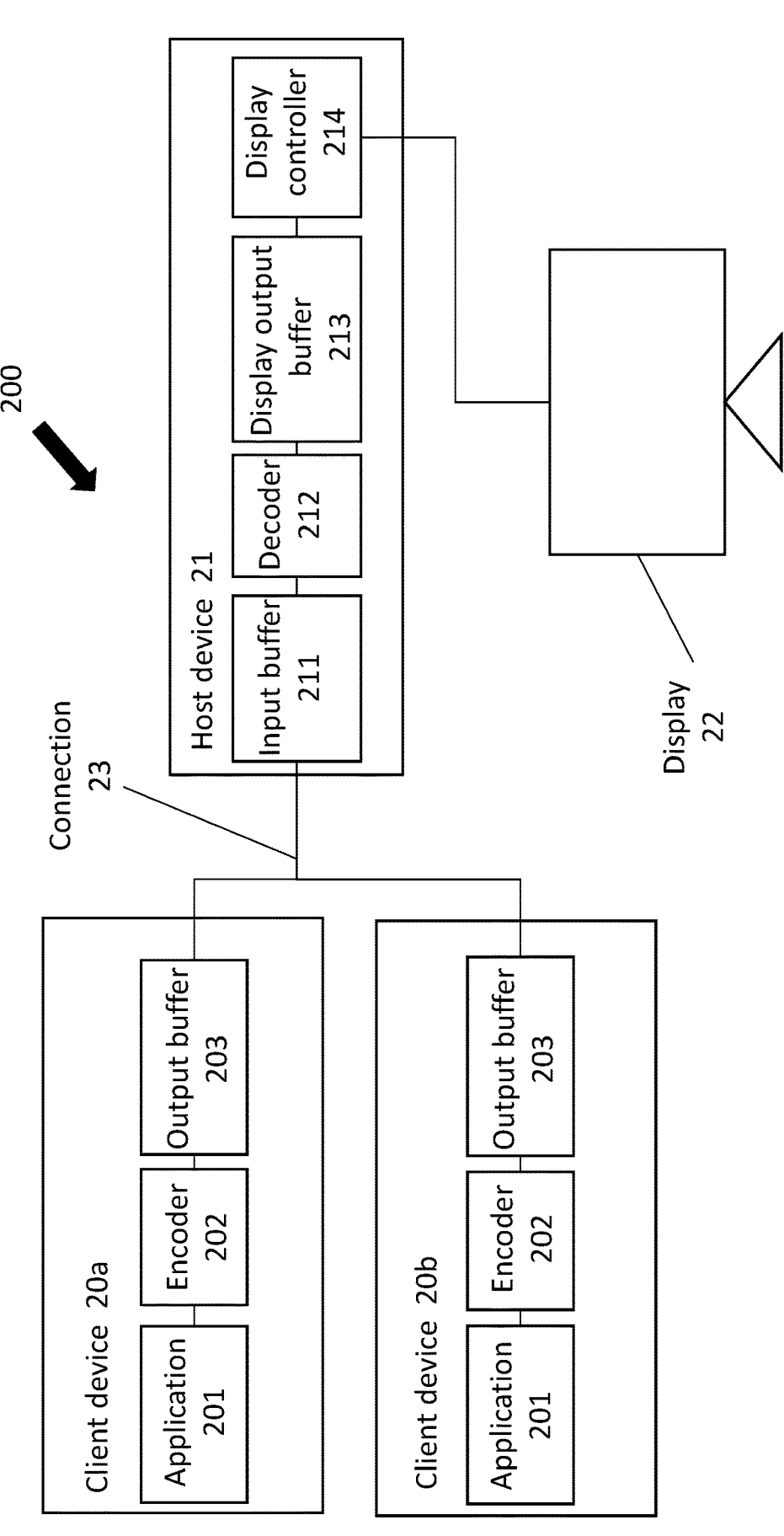
FIG. 2 shows a display system, in accordance with one or more embodiments of the present disclosure.

FIG. 2 shows an example display system [No] according to the present disclosure. The display system [No] of FIG. 2 includes a plurality of client devices [20a, 20b], a host device [21] and a display [22]. In this example, two client devices [20a, 20b] are shown. However, it will be appreciated that the number of connected client devices [20a, 20b] may be greater than two. Similarly, whilst in this example one display [22] is shown, there may be a plurality of displays [22] connected to the host device [21]. Each of the client devices [20a, 20b] may be any suitable device for transmitting display data to a host device [21]. The host device [21] may be any suitable device for receiving display data from the client devices [20a, 20b]. For example, each of the client devices [20a, 20b] and host device [21] may be a mobile cellular phone, personal computer (PC), laptop, wearable computing device, etc. adapted for wired or wireless communication.

Each of the client devices [20a, 20b] is connected to the host device [21] for transmission of display data to the host device [21]. The connection [23] between the client devices [20a, 20b] and the host device [21] may be any suitable wired or wireless connection. For example, the client devices [20a, 20b] may be connected to the host device [21] over a shared wireless network connection. Alternatively, the client devices [20a, 20b] may be connected to the host device [21] via a general purpose wired connection such as a Universal Serial Bus (USB) connection. The client devices may be connected via general purpose wired connection to a hub (for example, a USB hub), which in turn is connected via a general purpose wired connection to the host device [21]. The connection [23] between the client devices [20a, 20b] and the host device [21] may be a bandwidth limited connection.

At least one of the transmission resources between the client devices [20a, 20b] and the host device [21] is shared between the client devices [20a, 20b]. For example, the client devices [20a, 20b] may transmit display data using a shared wireless network resource. The client devices [20a, 20b] may transmit display data to the host device [21] using a shared transport layer. The client devices [20a, 20b] may transmit display data to the host device [21] using a shared Transmission Control Protocol (TCP).

Each client device [20a, 20b] may comprise an application poll, an encoder [202], and an output buffer [203]. The application [201] may generate display data. For example, a client device [20a, 20b] may comprise an application [201] that generates display data corresponding to a video or slides of a presentation. The application [201] forwards the generated display data to an encoder [202]. The unencoded display data may be stored in a buffer, not shown in the figure, accessible to the application [201] and the encoder [202]. The encoder [202] encodes the generated display data in preparation for transmission to the host device [21] via the connection [23]. The encoder [202] may control a level of compression to be applied to the display data and may perform any other processing required to prepare the display data for transmission to the host device [21]. The encoded display data may be stored in an output buffer [203] before being transmitted from the client device [20a, 20b] to the host device [21] via the connection [23]. The output buffer [203] may be a first-in first-out (FIFO) buffer.

The display data generated by the application [201] may correspond to frames of display data. For example, when the application [201] generates a video, the application [201] generates a series of image frames. Each image frame may be divided into tiles of display data. Each tile of display data corresponds to a group of adjacent pixels of the image. The group of pixels may be rectangular. Each tile of display data may be encoded and/or transmitted to the host device [21] independently of the encoding and transmission of the other tiles of display data.

The host device [21] may comprise an input buffer [211], decoder [212], a display output buffer [213], and a display controller [214]. The encoded display data transmitted by each of the client devices [20a, 20b] is received at the host device [21] and stored in an input buffer [211]. The input buffer [211] may be a first-in first-out (FIFO) buffer, for example. A decoder [212] of the host device [21] retrieves encoded display data from the input buffer [211] and decodes the display data. The decoded display data is stored in a display output buffer [213].

In some embodiments, the host device [21] comprises a display controller [214] for controlling a display [22] connected to the host device [21]. The display controller [214] retrieves decoded display data from the display output buffer [213] and controls the display of the data on the display [22] via a connection between the host device [21] and the display [22]. However, the display controller need not necessarily be provided at the host device [21]. For example, the display controller could instead be provided at the display [22] or as a separate device between the host device [21] and the display [22].

The host device [21] may be connected to a plurality of displays [22]. For example, the host device [21] may be connected to a first display [22] for displaying display data generated by the first client device [20a] (for example, slides of a presentation) and also be connected to a second display [22] (not shown) for displaying display data generated by the second client device [20b] (for example, a video). Alternatively, the display data from the client devices [20a, 20b] may be mixed, such that some display data from each device is displayed on one or more of the displays [22].

Since the client devices [20a, 20b] use a shared connection [23] to transmit the encoded display data to the host device [21], it is desirable for the amount of data transmitted by each client device [20a, 20b] to be controlled, to ensure stable and predictable usage of the transmission resources.

Resource Management at Host Device

Figure 3:
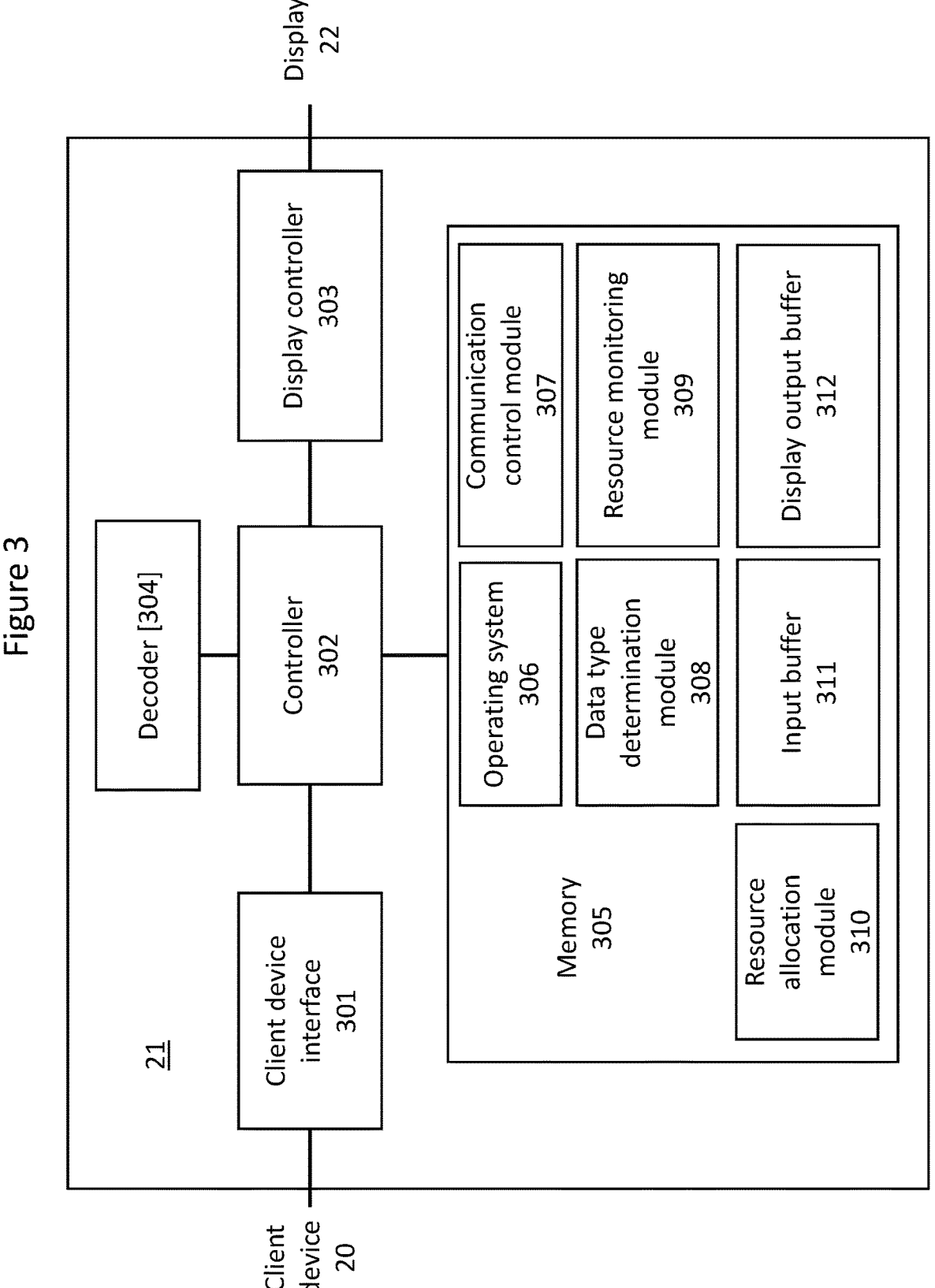
FIG. 3 shows a simplified schematic illustration of a host device, in accordance with one or more embodiments of the present disclosure.
Figure 4:
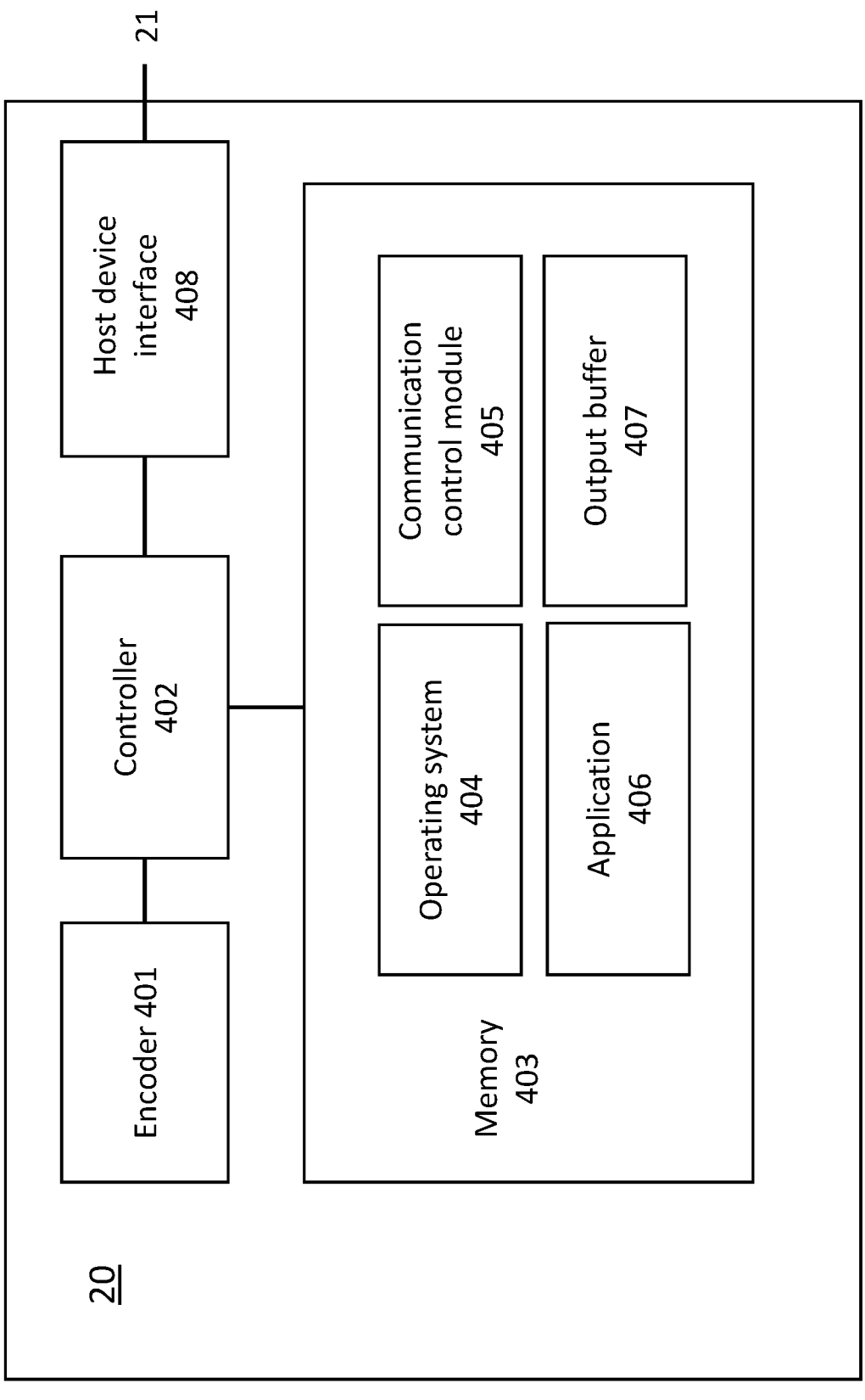
FIG. 4 shows a simplified schematic illustration of a client device, in accordance with one or more embodiments of the present disclosure.
Figure 5:
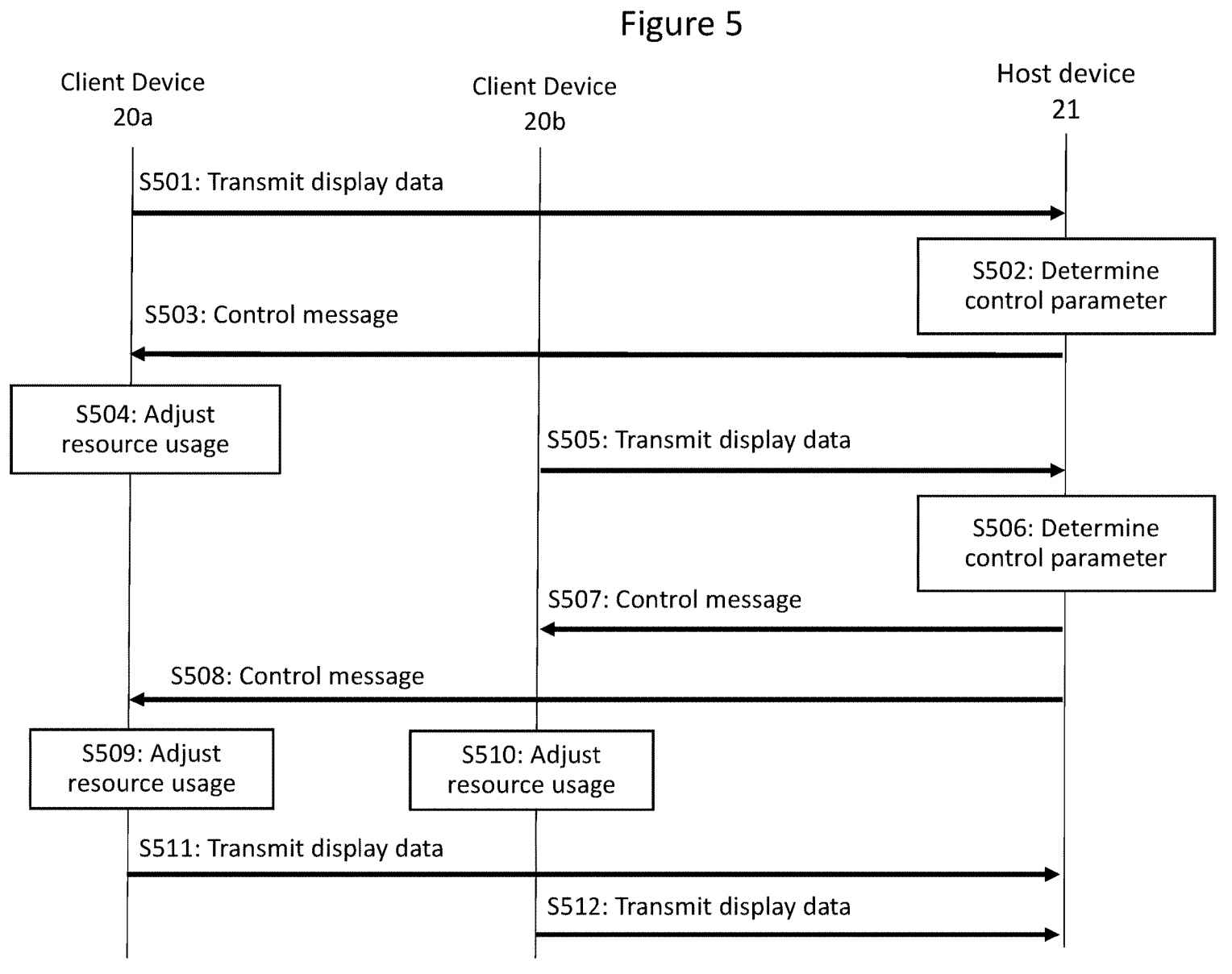

Methods and apparatuses for control of the generation of display data at the client devices [20a, 20b] and transmission of display data to the host device [21] according to the present disclosure will now be described with reference to FIGS. 3 to 5.

In some embodiments, the control is performed at the host device [21]. Beneficially, centralized control of the processing and transmission resources of the system [No] enables more detailed and responsive control to be performed. Centralized control allows the system resources to be allocated based on the type of display data being transmitted by each client device [20a, 20b]. Different types of display data may have different quality requirements (for example, different latency or compression requirements), and centralized control enables more efficient allocation of the available resources between the different types of display data.

As will be described in more detail later, the host device [21] may determine a control parameter to transmit to a connected client device [20] in a control message. The host device [21] may control the amount of display data allowed to be transmitted by a client device [20] and may also control a quality of display data (e.g. a level of compression) generated by the client device [20]. The control may be performed based on the type of display data generated by each of the connected client devices.

Host Device

An example host device [21] will now be described in more detail, by way of example only, with reference to FIG. 3 which shows a simplified block diagram of a host device [21].

The host device [21] comprises a client device interface [301], a controller [302], a display controller [303], a decoder [304] and a memory [305]. The display controller [303] and decoder [304] have similar functions as the corresponding display controller [214] and decoder [212] described with reference to FIG. 2.

Software stored in the memory [305] includes, among other things, an operating system [306], a communication control module [307], a data type determination module [308], a resource monitoring module [309], and a resource allocation module [310]. The memory [305] may also include an input buffer [311] and a display output buffer [312], which have similar functions as the corresponding input buffer [211] and display output buffer [213] previously described with reference to FIG. 2. One or more of these buffers may be provided separately from the memory [305]. The host device [21] also stores any other required software for receiving and presenting display data (and other data that may be sent in a presentation system, such as audio data) received from the connected client devices [20].

The controller [302] controls overall operation of the host device [21] in accordance with software and instructions stored in the memory [305]. It will be appreciated that whilst, for ease of understanding, the controller [302] is described as operating under the control of a number of discrete software modules, the functionality attributed to these modules may be built into the overall operating system [306] or as separate code in such a way that the modules may not be discernible as discrete entities.

The host device [21] communicates with client devices [20] via the client device interface [301]. For example, the host device [21] receives display data from the client device [20] via the client device interface [301] and transmits control messages to the client device [20] via the client device interface [301].

As previously described with reference to FIG. 2, display data received from the client device [20] is stored in the input buffer [311] and then decoded by the decoder [304]. The decoded display data is stored in the display output buffer [312]. The display controller [303] controls the display of the decoded data on a connected display [22]. The communication control module [307] controls overall communications with the connected client devices [20] and display(s) [22].

The data type determination module [308] determines a type of display data that is received from a client device [20]. For example, the data type determination module [308] may determine that received display data corresponds to a slide of a presentation or may determine that the received display data corresponds to an image frame of a video. The data type determination module [308] may analyse the received display data to determine the data type, or the host device [21] may receive a separate indication of the display data type. For example, a client device [20] may provide an indication of the data type in a header field of a data packet used for transmitting the display data from the client device [20] to the host device [21].

The resource monitoring module [309] monitors a processing, memory and/or transmission resource of the system [200]. For example, the resource monitoring module [309] may monitor a usage level of a connection between the host device [21] and the connected client devices [20]. The resource monitoring module [309] may monitor the bandwidth usage of the connection. The resource monitoring module [309] may also measure latency of display data transmitted from a client device [20]. For example, the resource monitoring module [309] may determine the time taken between the transmission of the display data by the client device [20] and the display data being received at the host device [21]. The time at which the display data was transmitted by the client device [20] may be identified using an indication transmitted with the display data by the client device [20]. Alternatively, the resource monitoring module

[309] may determine the time taken between the transmission of the display data by the client device [20] and the data being displayed. Beneficially, since the latency is determined at the host device [21], there is no need to wait for a corresponding acknowledgment to be received at the client device [20] and the latency can be determined (and subsequent control of the system resources can be performed) faster.

The resource monitoring module [309] may also monitor the status of a processing or memory resource at the host device [21]. For example, the resource monitoring module [309] may monitor the status of the input buffer [311], the display output buffer [312], or the processing resources available for decoding display data.

The resource monitoring module [309] may also monitor the status of a processing or memory resource at a connected client device [20]. For example, the resource monitoring module [309] may monitor the status of the output buffer [203], or the processing resources available for encoding display data at a client device [20]. A client device [20] may transmit an indication of a status of a processing or memory resource at the client device [20] to the host device [21].

The resource allocation module [310] may determine a resource to be allocated to the processing, storage or transmission of display data. As will be described in more detail later, the resource allocation module may determine a control parameter to be transmitted to a connected client device [20]. For example, control parameter may identify an encoding parameter to be used at the client device [20], or a bandwidth of the connection to the host device [21] that is allowed to be used by the client device [20].

Client Device

An example client device [20] will now be described, by way of example only, with reference to FIG. 4 which shows a simplified block diagram of a client device [20].

The client device [20] comprises a host device interface [408], a controller [402] and a memory [403]. The client device [20] includes an encoder [401] that has similar functions as the encoder [202] previously described with reference to FIG. 2.

Software stored in the memory [403] includes, among other things, an operating system [404] and a communication control module [405]. The memory [403] may also include an output buffer [407] that has similar functions as the output buffer [203] previously described with reference to FIG. 2.

The controller [402] controls overall operation of the client device [20] in accordance with software and instructions stored in the memory [403]. It will be appreciated that whilst, for ease of understanding, the controller [402] is described as operating under the control of a number of discrete software modules, the functionality attributed to these modules may be built into the overall operating system [404] or as separate code in such a way that the modules may not be discernible as discrete entities.

The client device [20] communicates with the host device [21] via the host device interface [408]. For example, the client device [20] transmits encoded display data to the host device [21] via the host device interface [408] and receives control messages from the host device [21] via the host device interface [408].

As previously described with reference to FIG. 2, the application [406] generates display data which is then encoded by the encoder [401]. The encoded display data is stored in the output buffer [407] for subsequent transmission to the host device [21] via the host device interface [408].

The client device [20] may receive a control message from the host device [21] via the host device interface [408]. The control message may identify, for example, an encoding parameter to be used by the encoder [401], or a bandwidth of the connection to the host device [21] that is allowed to be used by the client device [20] to transmit display data.

Control Method

An example resource management process performed by the system [No] will now be described with reference to FIG. 5, which shows an example of a centralized control method.

In an embodiment, in step S501, the first client device [20*a*] transmits encoded display data to the host device [21]. It will be appreciated that the method of FIG. 5 may be performed when the first client device [20*a*] first transmits encoded display data to the host device [21] after connecting to the host device [21], and/or may be performed when the first client device [20*a*] transmits any subsequent display data to the host device [21].

The host device [21] receives and decodes the display data and forwards the decoded display data for display at a connected display [22]. The host device [21] may transmit an acknowledgement to the client device [20*a*] that the display data has been received. The host device may also, or instead, transmit an indication to the client device [20*a*] that a corresponding frame of display data has been displayed on the connected display [22].

The data type determination module [308] of the host device [21] may determine the type of display data received from the first client device [20*a*]. In this example, the data type determination module [308] determines that the first client device [20*a*] has transmitted display data corresponding to a slide of a presentation.

In some embodiments, the resource monitoring module [309] of the host device [21] determines a bandwidth usage level of the connection [23] between the host device [21] and the client device [20*a*].

In step S502, the resource allocation module [310] of the host device [21] determines a control parameter to transmit to the first client device [20*a*] in a control message. In this example, the control parameter is determined based on the data type determined by the data type determination module [308] and the bandwidth usage level determined by the resource monitoring module [309].

The control parameter may indicate a bandwidth of the connection [23] that the first client device [20*a*] is authorized to use to transmit display data. The control parameter may indicate an encoding parameter or level of compression to be applied to display data generated by the first client device [20*a*]. Alternatively, the control parameter may indicate a rate of display data that may be generated by the application [201], or resolution of display data to be generated by the application [201]. Examples of control messages that may be transmitted from the host device [21] to the client devices [20*a*, 20*b*] will be described in more detail later.

In step S503, the host device [21] transmits the control parameter to the first client device [20*a*] in a control message. In an example, the host device [21] transmits a control parameter indicating that the first client device [20*a*] may use up to 60 percent of the total bandwidth of the connection [23] between the client devices [20*a*, 20*b*] and the host device [21] to transmit display data.

In step S504, the first client device [20*a*] adjusts a usage of a processing, memory and/or transmission resource used by the first client device [20*a*] or adjusts any other suitable aspect of the generation and transmission of display data to the host device [21], based on the control message received in step S503. For example, when the control message includes an indication of a level of compression to apply to display data generated by the first client device [20*a*], the first client device [20*a*] applies the indicated level of compression. In this example, the first client device [20*a*] receives the indication that it may use up to 60 percent of the total bandwidth of the connection between the client devices [20*a*, 20*b*] and the host device [21] to transmit display data and manages the amount of display data transmitted to the host device [21] accordingly.

In step S505, the second client device [20*b*] transmits display data to the host device [21]. The data type determination module [308] of the host device [21] may determine the type of display data received from the second client device [20*b*]. In an example, the data type determination module [308] determines that the second client device [20*b*] has transmitted display data corresponding to a video.

In step S506, the resource allocation module [310] of the host device [21] determines a control parameter to transmit to the second client device [20*b*] in a control message. The host device [21] determines the control parameter to transmit based on the current resource usage determined by the resource monitoring module [309] and the type of display data transmitted by the second client device [20*b*]. Beneficially, since the host device [21] has also received display data from the first client device [20*a*], the control parameter is also determined based on the display data that is expected to be transmitted from the first client device [20*a*].

In some embodiments, the host device [21] has determined that the first client device [20*a*] is transmitting display data corresponding to slides of a presentation and the second client device [20*b*] is transmitting display data corresponding to a video. As previously discussed, different types of display data may have different quality requirements. For example, presentation slides may require a relatively low latency, since the user is likely to be actively interacting with the slides, whereas video data may require a lower level of compression or a higher resolution. Beneficially, since the host device [21] is aware of the types of display data being transmitted by each connected client device [20*a*, 20*b*], the host device [21] may perform control to ensure that each type of display data is transmitted at the required quality level.

In some embodiments, since the second client device [20*b*] is transmitting video data, which may require a relatively large fraction of the communication resources of the connection to the host device [21], the host device [21] allocates 70 percent of the total bandwidth of the connection for use by the second client device [20*b*]. The host device [21] also transmits a further control message to the first client device [20*a*], updating the bandwidth allocated to the first client device [20*a*] to 20 percent of the total bandwidth of the connection. In this example, the host device [21] reserves the remaining 10 percent of the total bandwidth for other communications.

As subsequent display data is received from the client devices [20*a*, 20*b*], the resource monitoring module [309] of the host device [21] may monitor the latency of display data received from the first and second client devices [20*a*, 20*b*]. If the latency rises above a predetermined threshold level, then the host device [21] may adjust the resources allocated to the first and second client devices [20*a*, 20*b*] accordingly.

In steps S507 and S508 the first and second client devices [10*a*, 10*b*] receive the corresponding control messages. In step S509 and S510, the first and second client devices [20*a*, 20*b*] adjust a usage of a processing, memory and/or transmission resource, or adjust any other suitable aspect of the generation and transmission of display data, as described for step S504.

In steps S511 and S512, the first and second client devices [20a, 20b] transmit further display data to the host device [21]. Beneficially, since the resources used to generate and transmit the display data in steps S511 and S512 are managed by the host device [21], rather than being managed individually by each client device [20a, 20b], the host device [21] is able to ensure that the total available bandwidth of the connection is not exceeded, and the available resources can be efficiently allocated between the first and second client devices [20a, 20b].

Figure 6:
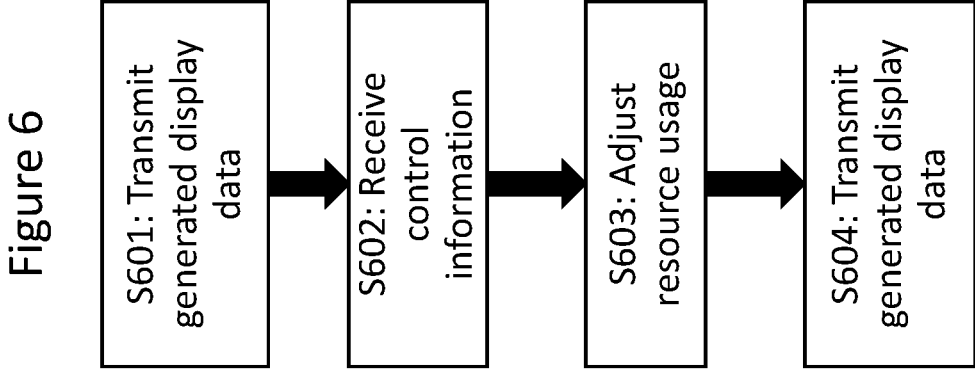
FIG. 6 shows an example of a method performed at a client device, in accordance with one or more embodiments of the present disclosure.

FIG. 6 shows an example of a method performed at a client device [20a, 20b]. In an embodiment, in step S601, the client device [20a, 20b] generates and transmits encoded display data to the host device [21]. It will be appreciated that the method of FIG. 6 may be performed when the client device [20a, 20b] first transmits encoded display data to the host device [21] after connecting to the host device [21], and/or may be performed when the client device [20a, 20b] transmits any subsequent display data to the host device [21]. The display data may be transmitted to the host device [21] via a shared connection.

In step S602, the client device [20a, 20b] receives control information from the host device [21]. The control information is for controlling the generation, encoding and/or transmission of display data by the client device [20a, 20b]. In an example, the client device [20a, 20b] receives control information indicating that the client device [20a, 20b] may use up to 60 percent of the total bandwidth of the connection [23] between the client device [20a, 20b] and the host device [21] to transmit display data.

In step S603, the client device [20a, 20b] adjusts a usage of a processing, memory or transmission resource used by the client device [20a, 20b], or adjusts any other suitable aspect of the generation and transmission of display data to the host device [21], based on the control information received in step S602. For example, when the control information includes an indication of a level of compression to apply to display data generated by the client device [20a, 20b], the client device [20a, 20b] applies the indicated level of compression. In this example, the client device [20a, 20b] receives control information including an indication that it may use up to 60 percent of the total bandwidth of the connection between the client device [20a, 20b] and the host device [21] to transmit display data and manages the amount of display data transmitted to the host device [21] accordingly.

In step S604, the client device [20a, 20b] transmits further display data to the host device [21]. Beneficially, since the resources used to generate and transmit the display data in step S604 are managed by the host device [21], rather than being managed by the client device [20a, 20b], the host device [21] is able to ensure that the total available bandwidth of the connection is not exceeded, and the available resources can be efficiently allocated.

FIG. 7 shows an example of a method performed at a host device [21]. In an embodiment, in step S701, the host device [21] receives encoded display data from a client device [20a, 20b] over a shared connection. In some embodiments, the display data may be received at the host device [21] over a shared Transmission Control Protocol (TCP). In some embodiments, the connection is a bandwidth limited connection. It will be appreciated that the method of FIG. 7 may be performed when the host device [21] first receives encoded display data after a client device [20a, 20b] connects to the host device [21], and/or may be performed when a client device [20a, 20b] transmits any subsequent display data to the host device [21].

In step S702, the host device [21] decodes the display data and forwards the decoded display data for display at a connected display [22]. The host device [21] may transmit an acknowledgement to the client device [20a, 20b] that the display data has been received. The host device may also, or instead, transmit an indication to the client device [20a, 20b] that a corresponding frame of display data has been displayed on the display [22].

In optional step S703, the resource monitoring module [309] of the host device [21] determines a usage level of a processing, memory and/or transmission resource of the system. The usage level may be a usage level of a processing or memory resource of the client device [20a, 20b]. The determination of the usage level may comprise determining a latency corresponding to the received display data, and/or determining a bandwidth usage level of the shared connection.

In optional step S704, the data type determination module [308] determines the type of display data received from the first client device [20a]. The type of display data may be, for example, video display data or presentation display data.

In step S705, the resource allocation module [310] of the host device [21] determines control information to transmit to the client device [20a]. In this example, the control information is determined based on the data type determined by the data type determination module [308] and a usage level of a processing, memory and/or transmission resource of the system determined by the resource monitoring module [309]. The method may further comprise estimating a future usage level of a processing, memory and/or transmission resource of the system and determining the control information based on the estimated future usage level. As described in more detail below, the control information may be for controlling generation, encoding and/or transmission of display data by the client device [20a, 20b]. In some embodiments, the control information is for instructing a client device [20a, 20b] to adjust a quality level of display data corresponding to a region of the displayed image that a user has interacted with. In one embodiment, the display data received from the client device [20a] in step S701 corresponds to a first portion of an image frame, and the control information transmitted to the client device [20a, 20b] may be control information for controlling the generation, encoding or transmission of display data corresponding to a second portion of the image frame.

The control information may indicate a bandwidth of the connection [23] that the client device [20a, 20b] is authorized to use to transmit display data. In other words, the control information may indicate an allowed bandwidth of the shared connection allocated to the client device [20a, 20b]. The control information may indicate an encoding parameter or level of compression to be applied to display data generated by the client device [20a, 20b]. Alternatively, the control information may indicate a rate of display data that may be generated by the application [201], or a resolution or color bit depth of display data to be generated by the application poll. Examples of control messages that may be transmitted from the host device [21] to the client devices [20a, 20b] will be described in more detail later.

In step S706, the host device [21] transmits the control information to the client device [20a, 20b]. In an example, the host device [21] transmits control information indicating that the client device [20*a*, 20*b*] may use up to 60 percent of the total bandwidth of the connection [23] to transmit display data.

Control Messages

Example control parameters and control messages that may be transmitted by the host device [21] to a client device [20] will now be described.

The host device [21] may transmit a control message instructing a client device [20] to adjust an encoding parameter used to encode display data. For example, the host device [21] may instruct a client device [20] to encode display data using a higher level of compression.

The host device [21] may transmit a control message instructing a client device [20] to adjust a resolution of display data. The application [406] may then generate the display data using the indicated resolution. The host device [21] may also transmit a control message instructing a client device [20] to adjust a color bit depth of display data.

Beneficially, since the host device [21] is able to control the generation of the display data at the client devices [20*a*, 20*b*], rather than merely controlling the bandwidth of the connection to the host device [21] allocated to each client device [20*a*, 20*b*], the host device [21] can prevent client devices [20*a*, 20*b*] from generating large amounts of display data for which there will not be sufficient communication resources to transmit to the host device [21]. This may help provide a more efficient usage of the processing and memory resources at the client devices [20*a*, 20*b*].

After transmitting a first control message to a client device [20], the host device [21] may transmit a subsequent control message indicating that the client device [20] may revert to an original resource usage or quality level that was used before the first control message was received.

The host device [21] may transmit a control message indicating that a client device [20] is free to determine the resource usage and other settings used by the client device [20]. This control message may be transmitted, for example, if the host device [21] determines that the client device [20] is transmitting particularly high priority display data, or if the host device [21] determines that the client device [20] is an administrator device (or a device used by an administrator).

The host device [21] may transmit a control message that applies to some, but not all, of the display data generated by a client device [20]. For example, when a client device [20] is transmitting multiple types of display data to the host device [21], the control message may apply to only one of the types of display data. For example, when a client device [20] is transmitting display data corresponding to presentation slides and display data corresponding to a video, the host device [21] may transmit a control message to the client device [20] indicating a first level of compression that should be applied to the display data corresponding to presentation slides, and a separate control message indicating a second level of compression that should be applied to the display data corresponding to the video.

In one example, upon connection of a client device [20] to the host device [21], the host device [21] may transmit a lookup table of control parameters to the client device. Beneficially, the use of a lookup table provides an efficient way of indicating groups of control parameters to a client device [20] using an index. A set of control parameters may be grouped together to form a control policy. For example, a control policy may comprise a color bit depth to be used to generate the display data and level of compression to be applied to the display data, or any other suitable combination of control parameters or instructions. Each control policy may be assigned an index indicated in the lookup table, and the host device [21] may instruct a client device [20] to implement a control policy by transmitting the corresponding index to the client device [20].

Beneficially, since the host device [21] is able to perform fast and efficient control of the system resources, control may be performed within a single image frame. For example, the host device [21] may receive a portion of an image frame (for example, a tile of display data), and notify the client device [20] of a control parameter that should be used to generate and/or transmit a remaining portion of the image frame.

The host device [21] may transmit a control message to each connected client device [20] upon connection of a new client device [20] to the host device [21]. Since the newly connected client device [20] is likely to begin transmitting display data to the host device [21], the host device may pre-allocate some of the transmission resources to the newly connected device and send corresponding control messages to the other connected devices to adjust the bandwidth allocation.

In some embodiments, a control message transmitted from the host device [21] may indicate that a control parameter is to be used for a predetermined amount of time. Alternatively, a control message may indicate that a control parameter is to be used for a predetermined amount of display data, a predetermined number of frames of display data, or a predetermined number of tiles of display data. For example, when a user is scrolling through slides of a presentation, a large rise in the bandwidth required to transmit the display data corresponding to the slides may occur. If the user is rapidly scrolling through the slides, the user may be less likely to notice a reduction in the image quality of the slides. Therefore, in order to reduce the resource usage, the host device [21] may determine that a level of compression applied to the display data corresponding to the slides should be temporarily increased. For example, the host device [21] may indicate that the level of compression should be increased for 10 seconds, or for 100 frames of display data. The host device [21] may transmit a subsequent control message extending this period or may transmit a subsequent control message reverting the parameter change.

In one example, a client device [20] may revoke or override an instruction received from the host device [21] if the client device [20] does not receive a further control message from the host device [21] within a predetermined period of time.

In one example, a client device [20] may transmit a message to the host device [21] indicating that an amount of data in an output buffer [407] of the client device [20] has exceeded a threshold value. In response to receiving the message from the client device [20], the host device [21] may determine to increase the transmission resources allocated to the client device [20].

Whilst the above control messages have been described with reference to display data, it will be appreciated that other types of data may also transmitted in a presentation system. For example, audio data may be transmitted from the client devices [20] to the host device [21]. It will be appreciated, therefore, that the host device [21] may also perform control regarding the generation and transmission of audio data. For example, the host device [21] may determine that received audio data corresponds to speech and determine a quality level (e.g. a level of compression) to be applied to the audio data at the client device [20].

It will be appreciated that the host device [21] may transmit any suitable combination of the above control messages and control parameters to some or all of the connected client devices [20].

In one example, the host device [21] may transmit a control message to all of the connected client devices [20] when the total data rate from all the connected client devices [20] exceeds a predetermined threshold value, to reduce the amount of data being transmitted by each of the client devices [20].

Example Computer System

FIG. 8 is a block diagram of a computer system [800] suitable for implementing one or more embodiments of the present disclosure, including a client device [20], or the host device [21]. In various implementations, the host device [21] may include a mobile cellular phone, personal computer (PC), laptop, wearable computing device, etc. adapted for wired or wireless communication, and each of client device [20] or the host device [21] may include a network computing device. Thus, it should be appreciated that these devices [20, 21] may be implemented as the computer system [800] in a manner as follows.

The computer system [800] includes a bus [812] or other communication mechanism for communicating information data, signals, and information between various components of the computer system [800]. The components include an input/output (I/O) component [804] that processes a user action, such as selecting keys from a keypad/keyboard, selecting one or more buttons or links, etc., and sends a corresponding signal to the bus [812]. The I/O component [804] may be connected to an output component, such as a display [802] and to a cursor control [808] (such as a keyboard, keypad, mouse, etc.). An optional audio input/ output component [806] may also be included to allow a user to use voice for inputting information by converting audio signals. The audio I/O component [806] may allow the user to hear audio. A transceiver or network interface [820] transmits and receives signals between the computer system [800] and other devices via network [822]. In one embodiment, the transmission is wireless, although other transmission mediums and methods may also be suitable. A processor [814], which can be a micro-controller, digital signal processor (DSP), or other processing component, processes these various signals, such as for display on the computer system [800] or transmission to other devices via a communication link [824]. The processor [814] may also control transmission of information, such as cookies or Internet Protocol (IP) addresses, to other devices.

The components of the computer system [800] also include a system memory component [810] (e.g., RAM), a static storage component [816] (e.g., Read-only Memory (ROM)), and/or a disk drive [818] (e.g., a solid-state drive, a hard drive). The computer system [800] performs specific operations by the processor [814] and other components by executing one or more sequences of instructions contained in the system memory component [810]. For example, the processor [814] could be utilized to perform the control functions of the host device [21].

Executable logic for performing any described functions may be encoded in a computer readable medium, which may refer to any medium that participates in providing instructions to the processor [814] for execution. Such a medium may take many forms, including but not limited to, non-volatile media, volatile media, and transmission media. In various implementations, non-volatile media includes optical or magnetic disks, volatile media includes dynamic memory, such as the system memory component [810], and transmission media includes coaxial cables, copper wire, and fiber optics, including wires that comprise the bus [812]. In one embodiment, the logic is encoded in non-transitory computer readable medium, such as a magnetic or optical disk or other magnetic/optical storage medium, or flash or other solid-state memory (e.g. integrated into a device or in the form of a memory card). In one example, transmission media may take the form of acoustic or light waves, such as those generated during radio wave, optical, and infrared data communications.

In various embodiments of the present disclosure, execution of instruction sequences to practice the present disclosure may be performed by the computer system [800]. In various other embodiments of the present disclosure, a plurality of computer systems [800] coupled by the communication link [824] to the network [822] (e.g., such as a local area network (LAN), Wireless LAN (WLAN), Public Switched Telephone Network (PTSN), and/or various other wired or wireless networks, including telecommunications, mobile, and cellular phone networks) may perform instruction sequences to practice the present disclosure in coordination with one another.

Modifications and Alternatives

The above embodiments and examples are to be understood as illustrative examples. Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The client devices [20] may be local to the host device [21] (for example, in the same meeting room as the host device [21]) or may be remote devices (for example, at a remote location and connected to the host device [21] via the internet).

Whilst in the above examples the control messages transmitted by the host device [21] have mainly been described with reference to the resources of the connection between the client devices [20] and the host device [21], and the processing and memory resources available at the client devices [20], control may also be performed based on the available processing and memory resources available at the host device [21]. For example, the host device [21] may be limited by the processing power required at the host device [21] to decode the display data and forward the data for display. In this case, the host device [21] may transmit control messages to each of the connected client devices

[20] to reduce the total amount of display data transmitted to the host device [21], to reduce the processing power required at the host device [21] to decode the display data. For example, a control message may be transmitted when the idle time of a processor of the host device [21] falls below a predetermined threshold idle time.

The host device [21] may be provided with a control-panel for managing the presentation system. The control panel may be a remote-control panel connected to the host device [21] via any suitable wired or wireless connection.

Whilst in the above examples the host device [21] has been described as performing control of the generation and encoding of the display data at the client devices [20], it will be appreciated that the host device [21] may only control the bandwidth allocated to each client device [20]. Nevertheless, the advantages of a more predictable and stable usage of the bandwidth is achieved, since the host device [21] is able to manage the bandwidth allocation based on the requirements (for example, required quality levels and predicted bandwidth requirements) of all the connected client devices [20].

The display [22] connected to the host device [21] may be a touchscreen display. In one example, the host device [21] may determine to transmit a control message when a user touches the display [22] to interact with the presented images. A user is more likely to notice low-quality display data in a region in which the user is actively interacting. Therefore, the host device [21] may transmit a control message instructing a user device [20] to increase the quality level (for example, reduce the level of compression) of display data corresponding to the region with which the user interacted. Similarly, the host device [21] may determine to increase a quality level of display data when a user interacts with a corresponding region of the image using a mouse or any other suitable type of peripheral device.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Some embodiments are also described in the following numbered clauses:

1. A method of managing display data in a system comprising a host device and a plurality of client devices connected to the host device, the method comprising:
   receiving display data from at least one client device of the plurality of client devices at the host device via a shared connection between the plurality of client devices and the host device;
   generating, at the host device, control information for controlling generation, encoding and/or transmission of the display data by the at least one client device of the plurality of client devices; and
   transmitting the control information from the host device to the at least one client device of the plurality of client devices.

2. The method according to clause 1, wherein the method further comprises determining, by the host device, a usage level of a processing, memory and/or transmission resource of the system;
   wherein the control information is generated based on the determined usage level.

3. The method of clause 2, wherein the determination of the usage level comprises,
   determining a latency corresponding to the display data received via the shared connection, and/or determining a bandwidth usage level of shared the connection.

4. The method of clause 2 or 3, wherein the determination of the usage level comprises determining a usage level of a processing or memory resource of the at least one of the plurality of client devices.

5. The method of any preceding clause, wherein the shared connection is a bandwidth-limited connection.

6. The method of any preceding clause, wherein the display data is received at the host device over a shared Transmission Control Protocol (TCP) connection from the at least one client device of the plurality of client devices.

7. The method of any preceding clause, wherein the control information comprises one or more of:
   an indication of an allowed bandwidth of the shared connection allocated to one of the plurality of client devices,
   an encoding parameter to be used by the at least one of the plurality of client devices to encode the display data, and
   an indication of a resolution or color bit depth to be used by the at least one of the plurality of client devices to generate the display data.

8. The method of any preceding clause, the method further comprising
   determining, by the host device, a type of display data received from a client device of the plurality of client devices; and
   generating the control information based on the type of display data.

9. The method of clause 8, wherein the type of display data indicates the display data corresponds to a video or a slide of a presentation.

10. The method of any preceding clause, wherein the display data received by the host device corresponds to a first portion of an image frame; and wherein
   after the display data corresponding to the first portion of the image frame has been received at the host device, the host device generates control information for controlling the generation, encoding or transmission of display data corresponding to a second portion of the image frame.

11. The method of any preceding clause, the method further comprising displaying the display data transmitted by the at least one client device of the plurality of client devices to the host device as an image on a display connected to the host device.

12. The method of clause 11, the method further comprising transmitting, by the host device, the control information to instruct at least one of the plurality of client devices to adjust a quality level of display data corresponding to a region of the displayed image that a user has interacted with.

13. The method of any preceding clause, the method further comprising
   estimating, by the host device, a future usage level of bandwidth of the shared connection, and generating the control information based on the estimated future usage level of the bandwidth of the shared connection.

14. A method of managing display data in a system comprising a host device and a plurality of client devices connected to the host device, the method comprising:

generating and encoding display data at a client device of the plurality of client devices;

transmitting the generated display data from the client device to the host device via a shared connection between the plurality of client devices and the host device;

receiving, at the client device from the host device, control information for controlling the generation, encoding and/or transmission of display data by the client device; and adjusting the generation, encoding and/or transmission of the display data by the client device based on the received control information.

15. A system comprising:

a non-transitory memory storing instructions; and one or more hardware processors coupled to the non-transitory memory and configured to execute the instructions from the non-transitory memory to cause the system to perform operations comprising:

receiving display data from at least one client device of a plurality of client devices at a host device via a shared connection between the plurality of client devices and the host device;

generating, at the host device, control information for controlling the generation, encoding and/or transmission of display data by the at least one client device of the plurality of client devices; and transmitting the control information from the host device to the at least one client device of the plurality of client devices.

16. The system of clause 15, wherein the operations further comprise:

determining, by the host device, a usage level of a processing, memory and/or transmission resource of the system;

wherein the control information is generated based on the determined usage level.

17. The system of clause 15 or 16, wherein the control information comprises one or more of:

an indication of an allowed bandwidth of the connection allocated to the at least one client device of the plurality of client devices;

an encoding parameter to be used by the at least one client device of the plurality of client devices to encode the display data and a resolution or color bit depth to be used by the at least one client device of the plurality of client devices to generate the display data.

18. The system of any of clauses 15 to 17, wherein the operations further comprise:

determining, by the host device, a type of display data received from a client device of the plurality of client devices; and generating the control information based on the type of display data.

19. The system of any of clauses 15 to 18, wherein the operations further comprise:

displaying the display data transmitted by the at least one client device of the plurality of client devices to the host device as an image on a display connected to the host device, and transmitting, by the host device, control information to instruct at least one of the plurality of client devices to adjust a quality level of display data corresponding to a region of the displayed image that a user has interacted with.

20. The system of any of clauses 15 to 20, wherein the operations further comprise:

estimating, by the host device, a future usage level of the bandwidth of the connection, and generating the control information based on the estimated future usage level of the bandwidth of the connection.

The invention claimed is:

1. A method of managing display data in a system comprising a host device and a plurality of client devices connected to the host device, the method comprising:

receiving display data from at least one client device of the plurality of client devices at the host device via a shared connection between the plurality of client devices and the host device, the received display data including first display data corresponding to a first portion of an image frame;

displaying the image frame on a display connected to the host device;

determining, by the host device, a usage level of a processing or memory resource of the at least one client device, wherein determining the usage level comprises determining a status of an output buffer of the at least one client device, or determining an amount of processing resources available for encoding the display data at the at least one client device, wherein the output buffer stores the display data for transmission to the host device;

determining that a user is interacting with a second portion of the image frame;

after receiving, by the host device, the first display data, generating, at the host device, control information for adjusting a quality level of second display data corresponding to the second portion of the image frame based at least in part on the determined usage level of the processing or memory resource responsive to determining that the user is interacting with the second portion of the image frame; and transmitting the control information from the host device to the at least one client device of the plurality of client devices.

2. The method of claim 1, wherein the method further comprises:

determining, by the host device, a usage level of a transmission resource of the system;

wherein the control information is further generated based on the determined usage level of the transmission resource.

3. The method of claim 2, wherein the determination of the usage level of the transmission resource comprises:

determining a latency corresponding to the display data received via the shared connection, or determining a bandwidth usage level of the shared connection.

4. The method of claim 1, wherein the shared connection is a bandwidth-limited connection.

5. The method of claim 1, wherein the display data is received at the host device over a shared Transmission Control Protocol (TCP) from the at least one client device of the plurality of client devices.

6. The method of claim 1, wherein the control information comprises one or more of:

an indication of an allowed bandwidth of the shared connection allocated to one of the plurality of client devices, an encoding parameter to be used by the at least one of the plurality of client devices to encode the second display data, and an indication of a resolution or color bit depth to be used by the at least one of the plurality of client devices to generate the second display data.

7. The method of claim 1, the method further comprising:

determining, by the host device, a type of the display data received from a client device of the plurality of client devices; and generating the control information based on the type of the display data.

8. The method of claim 7, wherein the type of the display data indicates the display data corresponds to a video or a slide of a presentation.

9. The method of claim 1, the method further comprising estimating, by the host device, a future usage level of a bandwidth of the shared connection, and generating the control information based on the estimated future usage level of the bandwidth of the shared connection.

10. A system comprising:

a non-transitory memory storing instructions; and one or more hardware processors coupled to the non-transitory memory and configured to execute the instructions from the non-transitory memory to cause the system to perform operations comprising:

receiving display data from at least one client device of a plurality of client devices at a host device via a shared connection between the plurality of client devices and the host device, the received display data including first display data corresponding to a first portion of an image frame;

displaying the image frame on a display connected to the host device;

determining, by the host device, a usage level of a processing or memory resource of the at least one client device, wherein determining the usage level comprises determining a status of an output buffer of the at least one client device, or determining an amount of processing resources available for encoding display data at the at least one client device, wherein the output buffer stores display data for transmission to the host device;

determining that a user is interacting with a second portion of the image frame;

after receiving, by the host device, the first display data, generating, at the host device, control information for adjusting a quality level of second display data corresponding to the second portion of the image frame based at least in part on the determined usage level of the processing or memory resource responsive to determining that the user is interacting with the second portion of the image frame; and transmitting the control information from the host device to the at least one client device of the plurality of client devices.

11. The system of claim 10, wherein the operations further comprise:

determining, by the host device, a usage level of a transmission resource of the system;

wherein the control information is further generated based on the determined usage level of the transmission resource.

12. The system of claim 10, wherein the control information comprises one or more of:

an indication of an allowed bandwidth of the connection allocated to the at least one client device of the plurality of client devices;

an encoding parameter to be used by the at least one client device of the plurality of client devices to encode the second display data; and a resolution or color bit depth to be used by the at least one client device of the plurality of client devices to generate the second display data.

13. The system of claim 10, wherein the operations further comprise:

determining, by the host device, a type of the display data received from a client device of the plurality of client devices; and generating the control information based on the type of the display data.

14. The system of claim 10, wherein the operations further comprise:

estimating, by the host device, a future usage level of the bandwidth of the connection, and generating the control information based on the estimated future usage level of the bandwidth of the connection.

15. A method of managing display data in a system comprising a host device and a plurality of client devices connected to the host device, the method comprising:

receiving display data from at least one client device of the plurality of client devices at the host device via a shared connection between the plurality of client devices and the host device, the received display data corresponding to a first portion of an image frame;

determining, by the host device, a usage level of a processing or memory resource of the at least one client device, wherein determining the usage level comprises determining a status of an output buffer of the at least one client device, or determining an amount of processing resources available for encoding the display data at the at least one client device, wherein the output buffer stores the display data for transmission to the host device;

after receiving, by the host device, the display data corresponding to the first portion of the image frame, generating, at the host device, control information for controlling generation, encoding, or transmission of display data corresponding to a second portion of the image frame based at least in part on the determined usage level of the processing or memory resource; and transmitting the control information from the host device to the at least one client device of the plurality of client devices.

* * * * *